United States Patent
Gaydos et al.

(10) Patent No.: US 6,820,652 B2
(45) Date of Patent: Nov. 23, 2004

(54) MULTI-CHANNEL VALVE

(75) Inventors: Peter A. Gaydos, Hilliard, OH (US); Theodore Robert Adams, Dublin, OH (US)

(73) Assignee: Ventaira Pharmaceuticals, Inc., Columbus, OH (US)

( * ) Notice: Subject to any disclaimer, the term of this patent is extended or adjusted under 35 U.S.C. 154(b) by 49 days.

(21) Appl. No.: 10/328,811

(22) Filed: Dec. 24, 2002

(65) Prior Publication Data

US 2004/0118465 A1 Jun. 24, 2004

(51) Int. Cl.$^7$ .......................... F16K 15/14; A61M 37/00
(52) U.S. Cl. .................. 137/860; 137/512.4; 137/853; 137/605; 604/247
(58) Field of Search ................................ 604/207, 247, 604/213; 137/512.4, 843, 853, 860, 602, 605; 222/494

(56) References Cited

U.S. PATENT DOCUMENTS

| | | | |
|---|---|---|---|
| 4,739,906 A | 4/1988 | LoTurco | |
| 4,846,810 A | 7/1989 | Gerber | |
| 5,080,138 A | 1/1992 | Haviv | |
| 5,192,269 A | * 3/1993 | Poli et al. | 604/82 |
| 5,226,568 A | 7/1993 | Newton et al. | |
| 5,431,185 A | * 7/1995 | Shannon et al. | 137/512.4 |
| 5,613,517 A | * 3/1997 | Handler | 137/512.4 |
| 5,836,484 A | 11/1998 | Gerber | |
| 6,079,449 A | 6/2000 | Gerber | |
| 6,202,901 B1 | 3/2001 | Gerber et al. | |
| 6,286,725 B1 | 9/2001 | Gerber | |
| 6,325,253 B1 | 12/2001 | Robinson | |
| 6,419,662 B1 | * 7/2002 | Solazzo | 604/248 |

FOREIGN PATENT DOCUMENTS

GB        2106480 A        4/1983

* cited by examiner

*Primary Examiner*—Ramesh Krishnamurthy
(74) *Attorney, Agent, or Firm*—Gallagher & Dawsey Co. LPA; Michael J. Gallagher; David J. Dawsey (57) ABSTRACT

A multi-channel valve having a valve seat, a valve seal, and valve seal housing. The assembly of the apparatus creates a plurality of inlet, exit, and cross channels enclosed by elastomeric portions of a valve seal. The elastomeric portions of the valve seal create bounded distensible chambers. Pressure exerted by a fluid in excess of the cracking pressure of the seal tends to distend portions of the elastomeric seal and allow flow through and into the chambers. When inflow pressure falls, the elastic rebound of the elastomeric portions of the seal tends to expel fluid from the valve without backflow. Cross channel capacity allows mixing of the fluids. The plurality of, and differentials between, chambers allows one fluid to completely purge the valve of other fluids. The valve may be configured with additional backflow prevention capacities, such as channel variations, secondary elastomeric members, and variations in primary membrane properties.

37 Claims, 10 Drawing Sheets

MULTI-CHANNEL VALVE

TECHNICAL FIELD

The present invention relates to the field of fluid handling and control; particularly, to a passive multi-channel valve capable of completely purging a terminal channel.

BACKGROUND OF THE INVENTION

Those in the fluid handling industry have long-recognized the need for systems capable of delivering two or more fluids from respective reservoirs while preventing contaminants from entering the reservoirs, and systems that facilitate purging of critical fluid delivery channels. However, these desired characteristics have not previously been incorporated into a single valve.

The fluid handling industry has long-recognized the value in the simplicity of passive valves. Examples of such valves include U.S. Pat. No. 4,846,810 to Gerber, U.S. Pat. No. 5,080,138 to Haviv, and U.S. Pat. No. 5,836,484 to Gerber. In their most general sense, the valves of the '810, '138, and '484 patents incorporate an elastomeric sheath that tightly fits onto a valve body and controls the delivery of the fluid. Fluid is delivered through a channel in the valve body to a point in which the channel terminates against the inside surface of the annular sheath. Upon, a rise in fluid pressure above a predetermined level, known as the cracking pressure, the fluid forces the elastomeric sheath away from the valve body, thereby allowing the fluid to create a chamber between the sheath and the body into which it can flow. In the '810 and '138 devices, as the chamber expands due to the ingress of the pressurized fluid, the sheath is forced away from the body in the vicinity of a discharge channel, or channels, thereby permitting the fluid to exit the chamber through the discharge channel. As the fluid pressure falls below the cracking pressure, the sheath returns to a normal position tightly against the body, thereby sealing off the delivery channel and forcing the fluid remaining in the chamber into the discharge channel. The mechanism is similar in the '484 device, except that the elastic rebound of the sheath, instead of forcing fluid into a discharge channel, forces the fluid from the chamber to atmosphere.

The elastomeric sheaths of the '810, '138, and '484 valves function quite well in preventing contamination via backflow and migration of contaminants with a single fluid source. However, these do not satisfy the demand for a passive valve that can be effectively purged and can handle multiple fluids, and the unique challenges associated with multiple fluid control. In fact, the handling of multiple fluids and the associated challenges is often as important, if not more important, than the prevention of backflow.

Addressing the purge function, the prior art devices all lack a true purging capacity. In the '810, '138, and '410 devices, the elastic rebound of the sheath tends to force the fluid out of the chamber created by the distention of the elastomeric sheath, and into either a discharge channel or to atmosphere, as described above. At no point is the discharge channel or atmospheric chamber completely purged of fluid. In this sense, the prior devices might be most accurately seen to have a "volume reducing" capacity, in that the closing action of these valves does not truly purge but does tend to reduce the amount of fluid remaining in the valve when the fluid pressure drops below the predetermined cracking pressure.

To consider the practical aspects of this problem from a more concrete perspective, by way of illustration and not limitation, consider an application requiring the management of two fluids, one a fluid that for some reason is best handled by completely expelling it from the valve after closing, another a fluid that may remain in the valve after closing. By adjusting aspects of the design as will be discussed in detail below, possibly including the relative volumes of the respective fluid chambers, the valve of the instant design can be made to purge the first fluid from the valve. In such an exemplary construction, the second fluid may flow sequentially or for a longer time than the first fluid through the discharge channel as the valve is closing, thus purging the discharge channel of the first fluid with the second. A possible application, by way of example and not limitation, might be the provision of a heparin flush following the infusion of another pharmaceutical ingredient, to discourage in vivo clotting at the delivery point of the infusion.

An additional problem not addressed in the prior art relates to the problem of diffusion of small molecules through the elastomeric sheath. Numerous prior art valves are exposed in large part to the atmosphere, unless they were to be enclosed in a separate and specially designed chamber. Exposure to atmosphere would allow the continuous escape of small molecules through the elastomeric sheath in response to the concentration gradient present between the fluid in the valve and the atmosphere. Such diffusion would tend to increase the concentration of those elements of the fluid which are unable to move across the elastomeric sheath. To utilize a concrete example, by way of example and not limitation, if an active ingredient with a relatively large chemical structure were dissolved in ethanol, which has a very small chemical structure, ethanol molecules would tend to migrate across the elastomeric sheath to the atmosphere, thereby increasing the relative concentration in the fluid of the large molecules that were unable to diffuse across the barrier. If these large molecules were a drug with critical concentration dispensing requirements, it could pose adverse medical effects. Therefore, minimum exposure to the atmosphere is highly desirable.

Since the instant invention has a relatively small area of exposure to atmosphere, in certain embodiments, it may obviate a great deal of this problem. Any diffusion that should occur across a first elastomeric sheath diffusion area occurs into a closed space, and must then diffuse through a second portion of elastomeric sheath, generally having a smaller area for diffusion than the first diffusion area, in order to escape to atmosphere. This double barrier diffusion path may act to slow diffusion.

Perhaps most importantly, unlike the prior art designs, the present invention adds the capacity to effectively mix two or more fluids. Most obviously, a multiple chamber valve has the capacity to dispense multiple components at the same time in a mixed dispensing action, but the instant invention also adds considerably more than mixing to the fluid management capacity of the art.

For example, the traditional means of regulating the cracking pressure of the valve's elastomeric sheath, as seen in the prior art devices noted above, is by varying the thickness of the sheath and the bulk modulus of the elastomeric material. The instant invention, as will be described in detail below, adds new methods for regulating the cracking pressure of the valve, as well as tuning the cracking pressure at various locations on the sheath. By way of example, and not limitation, the cracking pressure can be regulated by varying the location of divisions of the chambers in a generally circumferential manner, or by varying the size of the divisions giving one chamber a larger arc of the elastomeric sheath than that of the other, or others. Such an increase would effectively create one chamber exposed to a longer spring with the same spring constant as the other, thus creating a lower cracking pressure.

As an additional fluid management tool, the instant invention, as will be described in detail below, offers the capacity for enhanced features to prevent fluid backflow. By way of example, and not limitation, the valve can be constructed with fluid entrance and exit ports of differing sizes and geometries. For example, a first port that supplies fluid to a chamber requires a first cracking pressure to force the seal from the opening. Fluid may then exit the chamber from a second port. If reverse flow tried to enter the chamber via the second port and the second port was one half the area of the first port, then the second (backflow) cracking pressure would be twice that of the first (forward flow) cracking pressure.

In contrast to valves seen in the prior art, the instant invention could also, by way of example and not limitation, be constructed so that the elastomeric sheath had areas of different thickness occluding the entrance and exit ports. A thicker sheath area over the exit port relative to the thickness seen over the entrance port would tend to require a second cracking pressure greater than the first cracking pressure.

Similarly, as will be discussed in detail below, and by way of example and not limitation, be present invention may be constructed with a second elastomeric sheath covering only the area of the discharge port. Such a construction would exert a check valve effect over the discharge port and would tend to substantially prevent backflow.

Accordingly, the art has needed a low cost, multi-channel passive valve that effectively prevents contamination of the fluid sources, allows for the purging of critical fluid delivery channels while accounting for the unique properties of the fluids being delivered, and gives enhanced abilities to manage fluid delivery characteristics. While some of the prior art devices attempted to improve the state of the art of single-channel non-purging valves, none have achieved the beneficial attributes of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings and limitations of prior devices in new and novel ways, and in any of a number of generally effective configurations. In one of the many preferable configurations, the multi-channel valve apparatus incorporates a valve seat, a valve seal, and valve housing, among other features. The valve is entirely passive in operation. The apparatus is generally configured such that the valve seal tightly encloses at least a portion of the valve seat and the valve housing releasably secures the valve seal to the valve seat. The apparatus is highly scalable in size and adaptable to a wide variety of fluids.

The valve seat is formed to have a plurality of channels directing the flow of at least one fluid, with at least one of the plurality of channels being at least one cross chamber channel. The number of channels present in a particular embodiment may reflect particular handling characteristics of the fluids to be utilized, or manufacturing considerations in the fabrication of the apparatus.

The valve seal tightly encloses a portion of the valve seat thereby covering a plurality of inlet and exit openings. In a basic configuration, the valve seal is formed to create a plurality of chambers when distended from the valve seat by a fluid at a predetermined pressure.

In an exemplary embodiment, the plurality of channels includes a plurality of inlet channels, at least one terminal channel, and at least one cross chamber channel connecting the plurality of chambers. Additionally, the valve seat is formed to have a seal engagement shelf, a top surface, and an exit surface.

A first inlet opening and a second inlet opening may be located on the top surface of the valve seat and a terminal channel exit opening may be located on the exit surface of the valve seat. In one particular embodiment all other channel openings, including a first exit opening, second exit opening, cross chamber inlet opening, cross chamber exit opening, and terminal channel inlet opening, are located on a sidewall of the valve seat.

The valve seal may be formed to have a plurality of separators, each having a separator width, a plurality of elastomeric portions each having an elastomeric portion thickness, and a plurality of retainers. Additionally, the exemplary valve seal incorporates a first elastomeric portion having a first thickness and a second elastomeric portion having a second thickness. The first elastomeric portion releasably covers the first exit opening and the cross chamber channel inlet opening, whereas the second elastomeric portion releasably covers the second exit opening, and the terminal channel inlet opening, thus creating two chambers. In additional variations the second elastomeric portion may releasably cover the cross chamber exit opening.

The valve housing may be formed to have an interior surface, an exterior surface, and a seal engagement ledge. The valve seal tightly mounts over the valve seat with a seat engagement ledge cooperating with the seal engagement shelf. The valve housing then fits over the valve seal and the valve seat releasably retains the valve seal through the cooperation of a seal engagement ledge and a retainer engagement shelf. Additionally, the inner surface of the valve housing may compress portions of a distal retainer and a proximal retainer formed in the valve seal to assist in forming a fluid-tight connection between the valve seal and the valve seat.

The sequence of the valve's operation begins with pressurized inflow through the plurality of inlet channels. When the cracking pressure of the valve has been reached, the pressure of the inflowing fluid distends the elastomeric portions of the valve seal, filling the chambers. The valve seal may be configured so that different chambers may have different cracking pressures. When the inflow pressure drops, the elastomeric portions of the seal force fluid through the terminal channel and out of the valve. The flow of a plurality of pressurized fluids may be staged sequentially or may flow simultaneously.

A unidirectional flow control device may be added in the cross chamber channel to prevent a second chamber fluid from entering the cross chamber channel exit opening. Flow may be configured so as to purge the entire terminal channel ensuring that all of the second chamber fluid is discharged from the terminal channel.

The plurality of chambers may include numerous variations resulting in embodiments that may be useful in a wide variety of industries. One such variation includes chambers having substantially equal volumes or substantially unequal volumes.

Varying the volumes of the plurality of chambers may be accomplished in a number of ways. For example, the locations of separators may be varied so that their locations are not substantially opposite each other. Separator width may be varied to be substantially equal or substantially unequal, thereby changing the characteristics of the chambers. Additionally, the properties of different elastomeric portions of the valve seal may be varied. For example, the bulk modulus of the valve seal may be varied in different portions of the valve seal, thereby influencing the volume, as well as the cracking pressure, of the chambers. In yet another variation, the thickness of different portions of the valve seal may be varied to produce desired effects, including varying the thickness of the elastomeric portions in strategic locations in the vicinity of the openings, so as to create directed channels within the chambers.

Another variation of the apparatus includes a backflow prevention secondary elastomeric member adapted to tightly fit in a secondary recess formed in the valve seat and situated to cover the exit openings. The valve seal may then cover the valve seat and secondary elastomeric member as previously described. The extra backflow protection is provided by the fact that if pressurized fluid were to enter the terminal channel, distending the second chamber and beginning to flow through the cross chamber channel to distend the first chamber, the fluid would act against the seal side of the secondary elastomeric member, thereby creating a tighter closure between the secondary elastomeric member and the inlet channel exit openings.

Additional variations of the apparatus incorporate valve housing alterations. In certain applications, such as those attempting to minimize the possibilities for diffusion across the elastomeric valve seal, it is advantageous to minimize the seal area that is exposed to atmosphere. Alternatively, certain applications warrant the additional backflow protection offered by having the valve housing vented to atmosphere.

Additional backflow prevention may be further obtained by varying the actual size of the various inlet and exit openings. For example, a small terminal channel inlet opening would require a tremendous backpressure to achieve the force necessary to distend the second chamber.

The plurality of channels may be formed to facilitate the specific fluid flow parameters of any particular application. For example, the plurality of channels may be extremely smooth and straight for optimum flow and minimum resistance, or they may be formed with harsh angles allowing for ease in manufacture. Additionally, the channels may be formed to take any shape and may be lined to prevent corrosion and reduce resistance. Similarly, the plurality of inlet openings may be adapted to mate with any fluid handling adaptor or fitting.

An alternative chamber forming method may include the cooperation of the valve seat and the valve housing to bound a plurality of elastomeric portions, thereby creating a plurality of chambers. For instance, in one embodiment the valve seat may be formed with a plurality of recesses in which a matching plurality of cooperating ledges on the inner surface of the valve housing tightly fit, compressing the valve seal. In this particular example, the cooperating recesses and ledges act to perform the same function as the plurality of separators previously described.

These variations, modifications, alternatives, and alterations of the various preferred embodiments, arrangements, and configurations may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The multi-channel valve apparatus of the instant invention enables a significant advance in the state of the art. The preferred embodiments of the apparatus accomplish this by new and novel arrangements of elements that are configured in unique and novel ways and which demonstrate previously unavailable but preferred and desirable capabilities.

The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
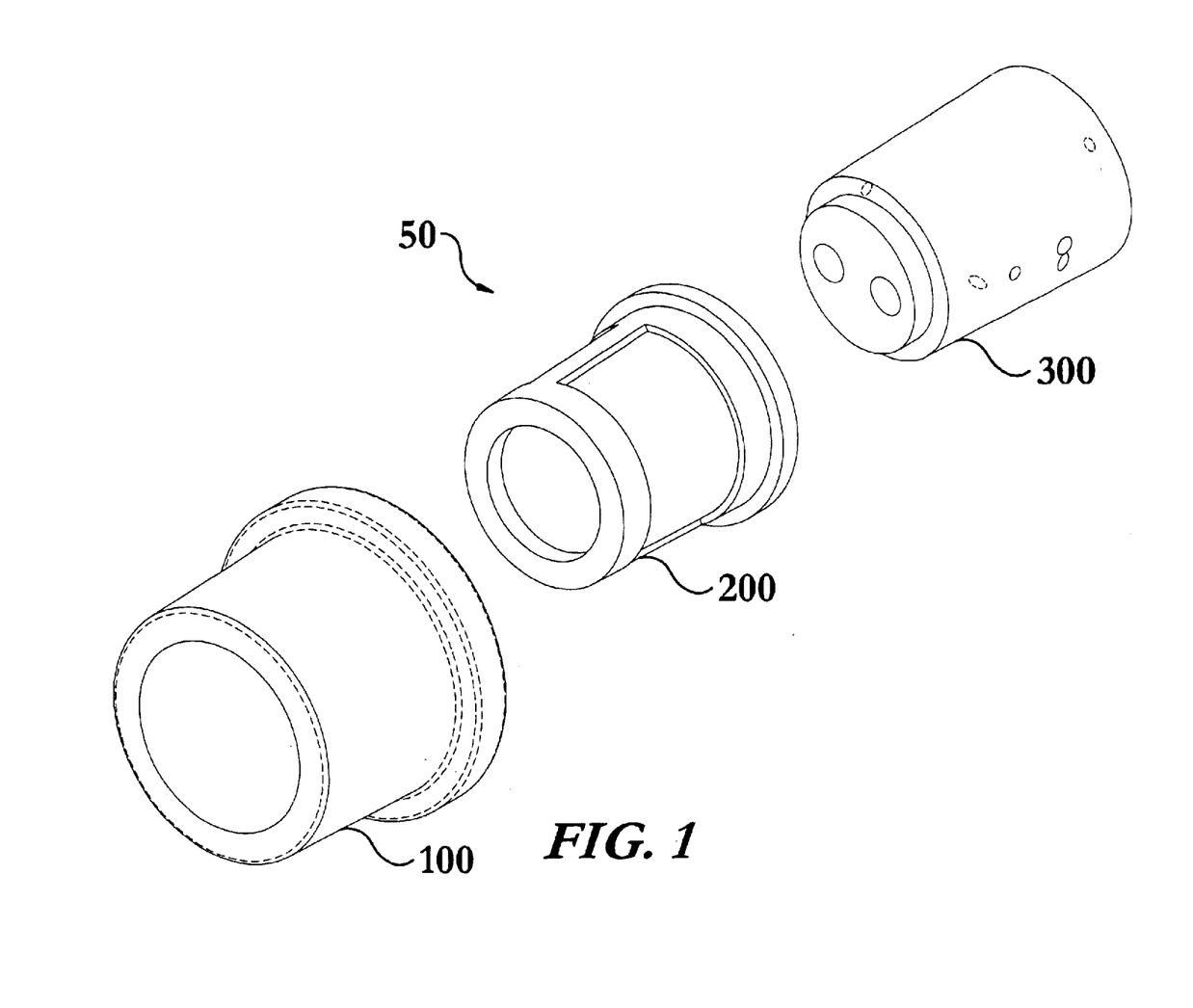
FIG. 1 is an exploded perspective view of the apparatus of the present invention.
Figure 2:
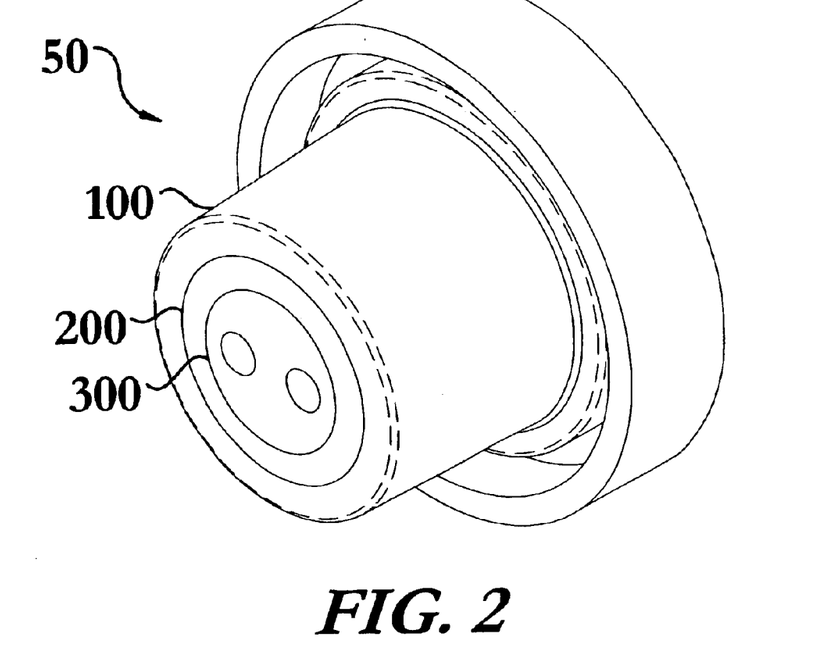
FIG. 2 is a perspective view of the apparatus of the present invention.
Figure 3:
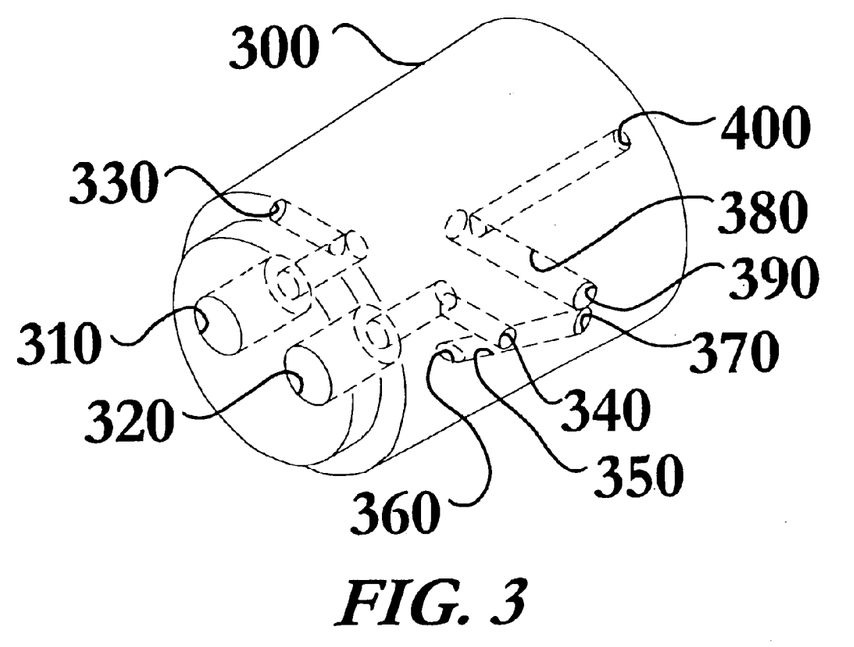
FIG. 3 is a perspective view of the valve seat of the present invention.
Figure 4:
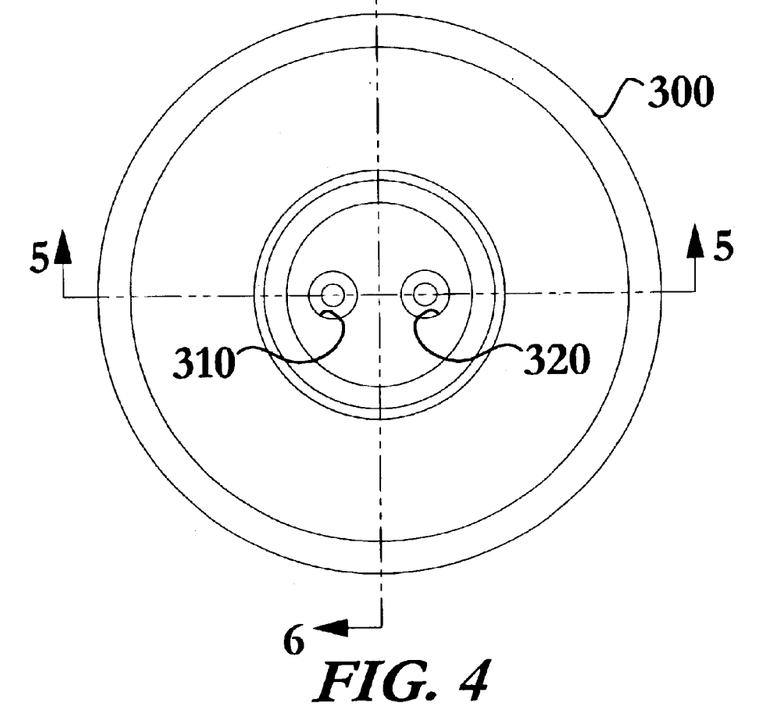
FIG. 4 is a top plan view of the valve seat of the present invention.

With reference generally now to FIG. 1 through FIG. 20, in one of the many preferable configurations, the multi-channel valve apparatus 50 in the most general form incorporates a valve seat 300, a valve seal 200, and a valve housing 100, as illustrated in FIG. 1. The apparatus 50 is generally configured such that the valve seal 200 is configured to tightly enclose at least a portion of the valve seat 300 and the valve housing 100 is configured to releasably secure the valve seal 200 to the valve seat 300, shown best in FIG. 2, FIG. 14, and FIG. 15.

Figure 5:
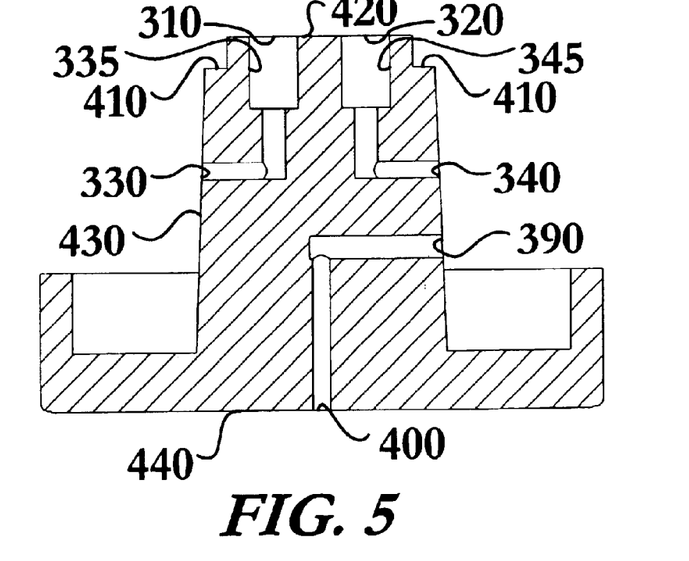
FIG. 5 is a cross section view taken along line 5—5 of FIG. 4.
Figure 6:
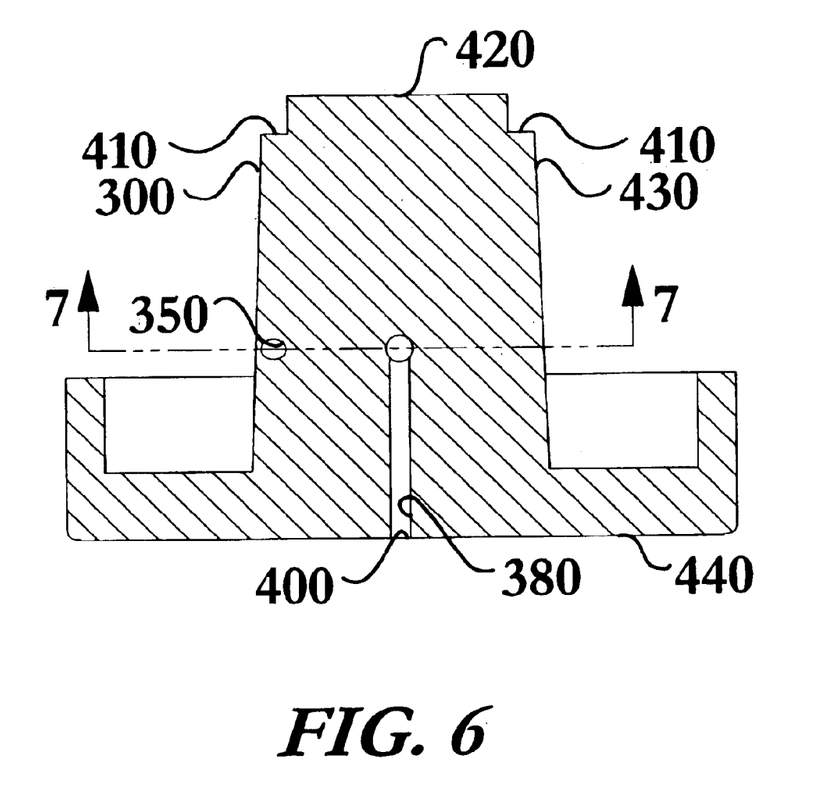
FIG. 6 is a cross section view taken along line 6—6 of FIG. 4.
Figure 9:
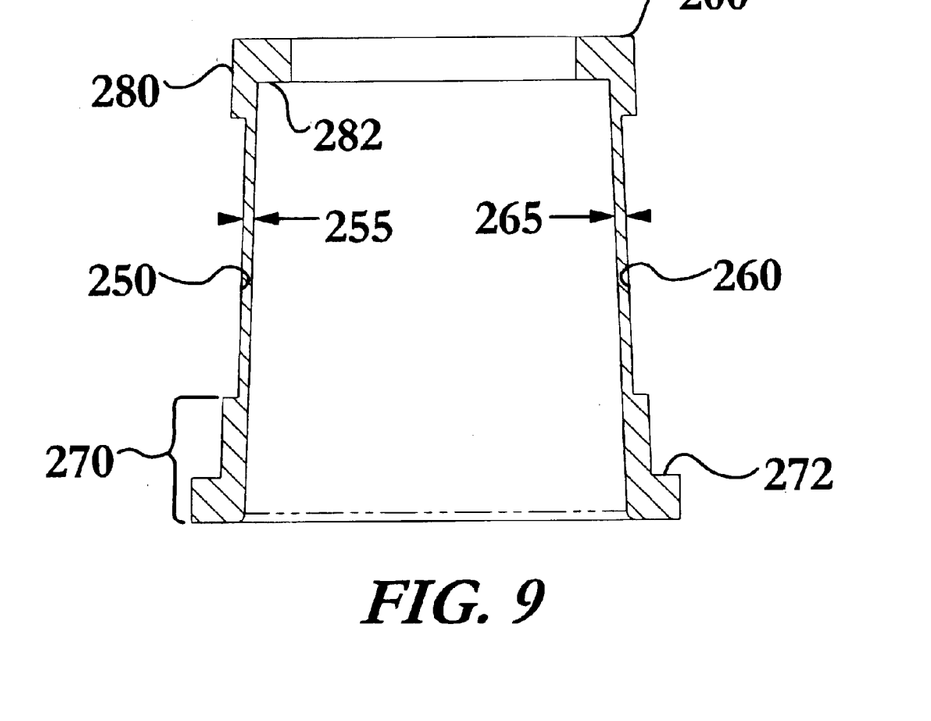
FIG. 9 is a cross section view taken along line 9—9 of FIG. 8.
Figure 10:
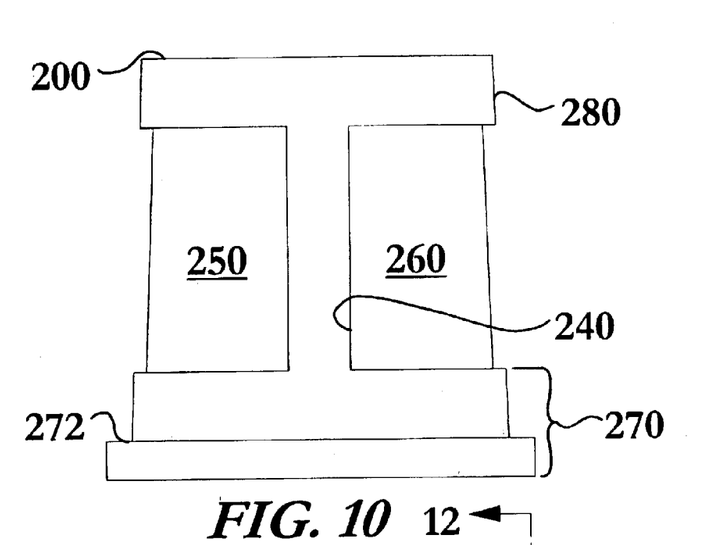
FIG. 10 is a front elevation view of the valve seal of FIG. 8.
Figure 11:
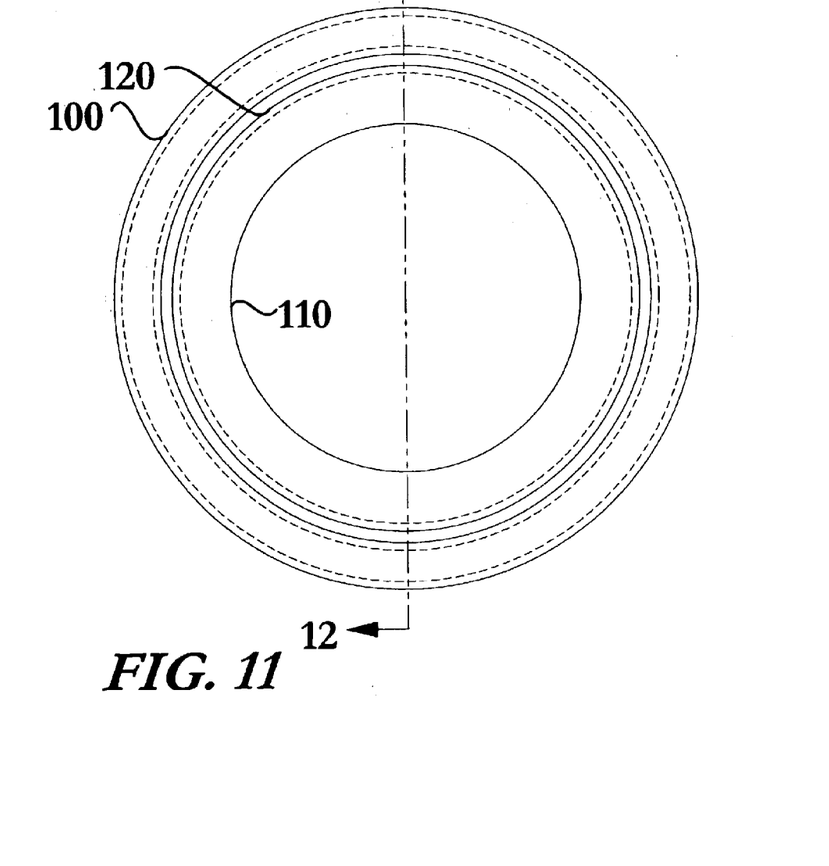
FIG. 11 is a top plan view of the valve seal housing of the present invention.
Figure 12:
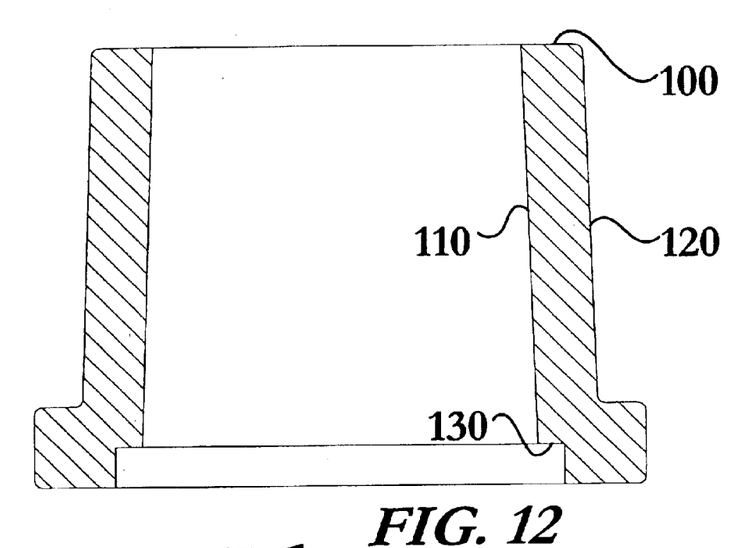
FIG. 12 is a cross section view taken along line 12—12 of FIG. 11.
Figure 13:
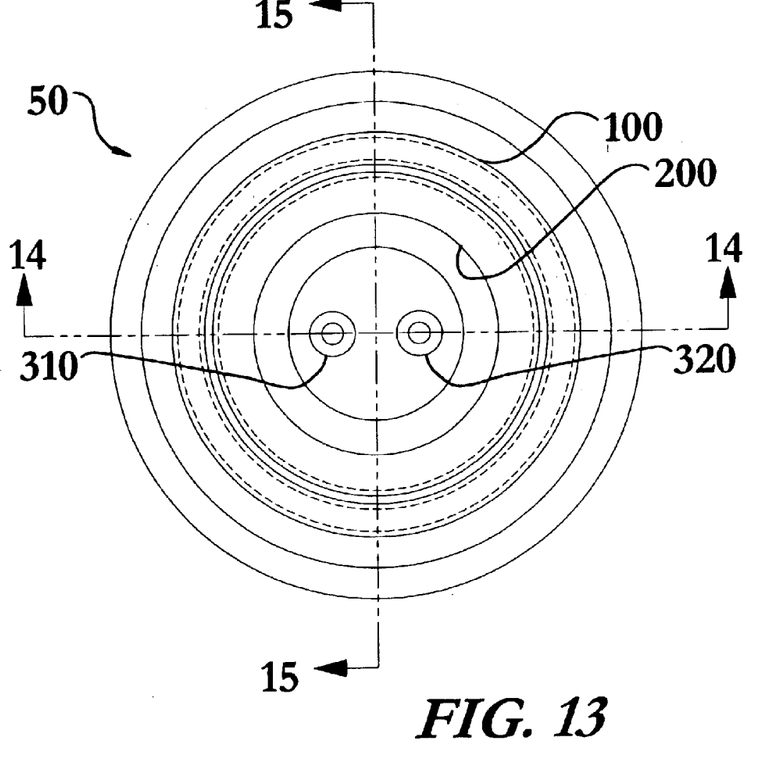
FIG. 13 is a top plan view of the apparatus of the present invention.
Figure 19:
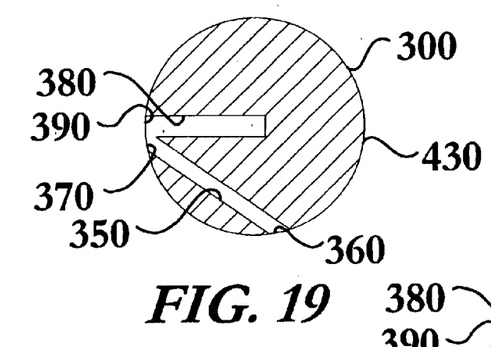
FIG. 19 is a cross section view taken along line 7—7 of FIG. 6 of a variation of the valve seat of FIG. 6.
Figure 20:
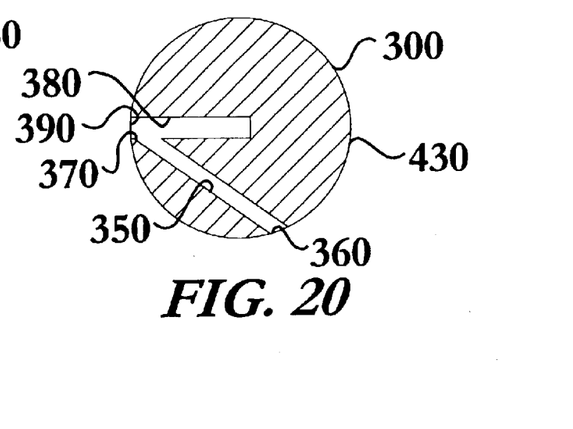
FIG. 20 is a cross section view taken along line 7—7 of FIG. 6 of a variation of the valve seat of FIG. 6.

Referring now to FIG. 3 through FIG. 7, the valve seat 300 is formed to have a plurality of channels directing the flow of at least one fluid, with at least one of the plurality of channels being at least one cross chamber channel 350. Each of the plurality of channels has at least one inlet opening wherein fluid enters the channel and at least one exit opening wherein fluid exits the channel. Additionally, the valve seat 300 is formed to have at least one sidewall 430 wherein the at least one cross chamber channel inlet opening 360 and at least one cross chamber channel exit opening 370 of the at least one cross chamber channel 350 may be located. Of course, the valve seat 300 may be formed in any number of geometries that one with skill in the art would recognize and the at least one sidewall 430 herein referenced may be any surface on such configurations. Further, the valve seal 200 tightly encloses a portion of the valve seat 300 thereby covering a plurality of the inlet and exit openings previously mentioned, as illustrated in FIG. 8 through FIG. 10, FIG. 14, and FIG. 16. In a basic configuration, the valve seal 200 is formed to create a plurality of chambers when distended by a fluid at a predetermined pressure. Lastly, the valve housing 100, illustrated in FIG. 11 and FIG. 12, is adapted to releasably secure the valve seal 200 to the valve seat 300. Now, for the purpose of explaining the general operation of one of numerous potential embodiments of the present invention, several aspects of the embodiment will be briefly described. First, in this exemplary embodiment, the plurality of channels includes a plurality of inlet channels including at least a first inlet channel 310 and a second inlet channel 320, at least one terminal channel 380, and at least one cross chamber channel 350, best illustrated in FIG. 3. Referring now to FIG. 5, the first inlet channel 310 has a first inlet opening 335 where fluid enters the first inlet channel 310 and a first exit opening 330 where fluid leaves the first inlet channel 310. Similarly, the second inlet channel 320 has a second inlet opening 345 and a second exit opening 340. The exemplary embodiment shown in FIG. 1 through FIG. 20 incorporates a single terminal channel 380 having a terminal channel inlet opening 390 and a terminal channel exit opening 400, and incorporates a single cross chamber channel 350 having a cross chamber channel inlet opening 360 and cross chamber channel exit opening 370, shown in FIG. 5, FIG. 6, and FIG. 7. Additionally, the valve seat 300 is formed to have a seal engagement shelf 410, a top surface 420, and an exit surface 440. Referring still to FIG. 5, the first inlet opening 335 and the second inlet opening 345 may be located on the top surface 420 and the terminal channel exit opening 400 may be located on the exit surface. In this particular embodiment all other channel openings including the first exit opening 330, second exit opening 340, cross chamber channel inlet opening 360, cross chamber channel exit opening 370, and terminal channel inlet opening 390 are located on the sidewall 430. Alternatively, the cross chamber channel exit opening 370 may be partially located on the at least one sidewall 430, as illustrated in FIG. 19, or may be located entirely on the terminal channel 380, as shown in FIG. 20.

Figure 8:
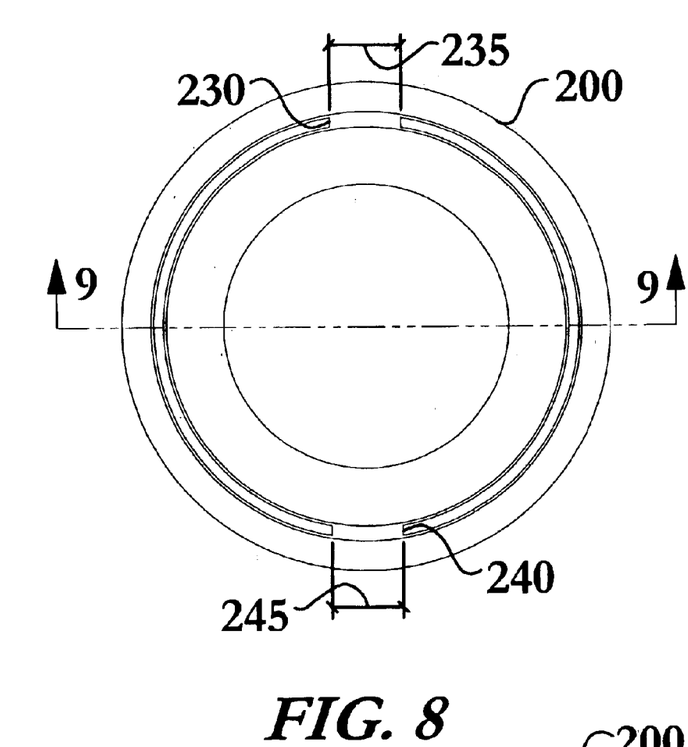
FIG. 8 is a top plan view of the valve seal of the present invention.

Secondly, the valve seal 200 is formed to have a plurality of separators each having a separator width, a plurality of elastomeric portions each having an elastomeric portion thickness, and a plurality of retainers. The valve seal 200 of the exemplary embodiment is formed to have a first separator 230 with a first separator width 235 and a second separator 240 with a second separator width 245, as shown in FIG. 8, FIG. 9, and FIG. 10. Additionally, the exemplary valve seal 200 incorporates a first elastomeric portion 250 having a first elastomeric portion thickness 255 and a second elastomeric portion 260 having a second elastomeric portion thickness 265, shown in FIG. 9. Further, the exemplary valve seal 200 is formed to have a distal retainer 270, having a retainer engagement shelf 272, and a proximal retainer 280, having a seat engagement ledge 282. With reference now to FIG. 3, FIG. 5, FIG. 8, and FIG. 9, the first elastomeric portion 250 releasably covers the first exit opening 330 and the cross chamber channel inlet opening 360 whereas the second elastomeric portion 260 releasably covers the second exit opening 340, cross chamber channel exit opening 370, and the terminal channel inlet opening 390. However, the second elastomeric portion 260 will not cover the cross chamber channel exit opening 370 in the embodiment illustrated in FIG. 20.

Figure 14:
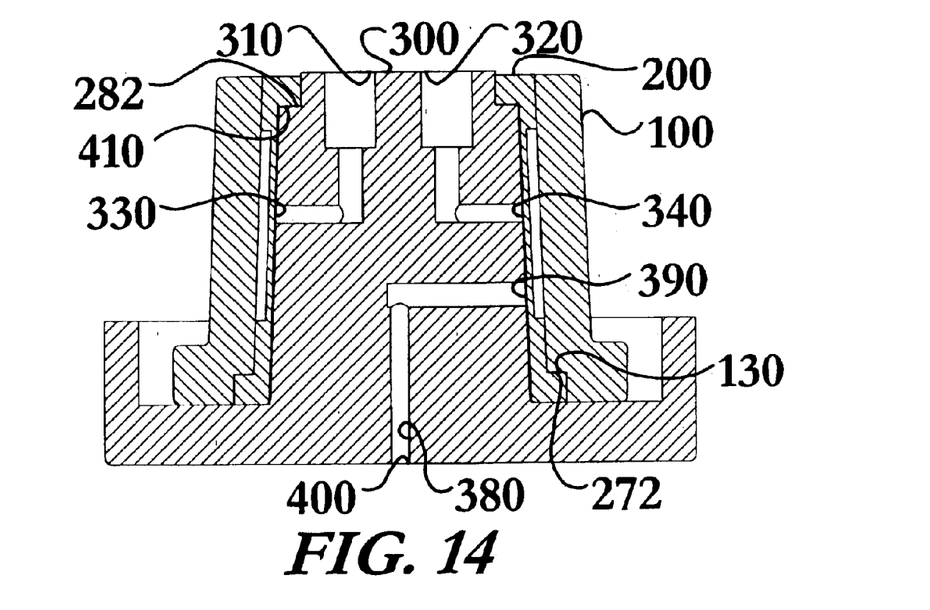
FIG. 14 is a cross section view taken along line 14—14 of FIG. 13.
Figure 15:
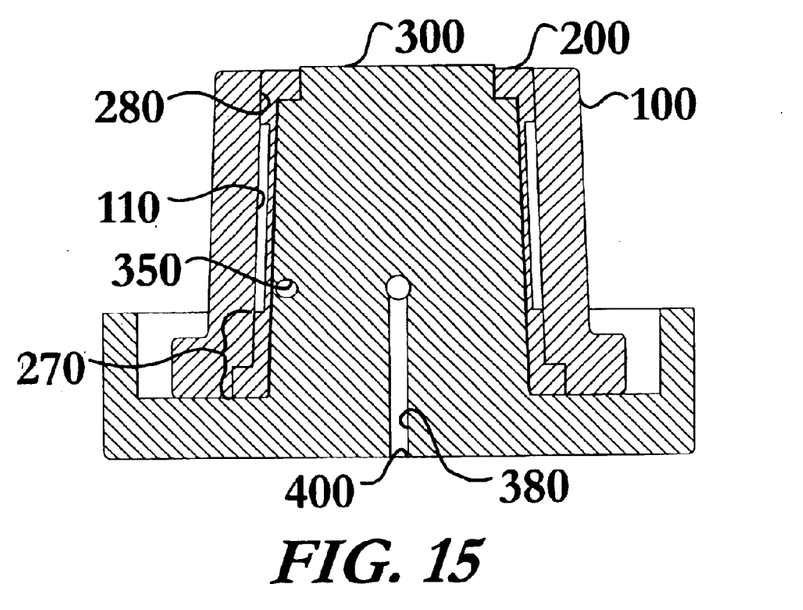
FIG. 15 is a cross section view taken along line 15—15 of FIG. 13.

Thirdly, referring now to FIG. 11 and FIG. 12, the valve housing 100 is formed to have a housing interior surface 110, a housing exterior surface 120, and a seal engagement ledge 130. As shown in assembled cross sectional view in FIG. 14 and FIG. 15, the valve seal 200 tightly mounts over the valve seat 300 with the seat engagement ledge 282 cooperating with the seal engagement shelf 410. The valve housing 100 then fits over the valve seal 200 and the valve seat 300 releasably retaining the valve seal 200 through the cooperation of the seal engagement ledge 130 and the retainer engagement shelf 272. Additionally, the housing interior surface 110 of the valve housing 100 may compress portions of the distal retainer 270 and the proximal retainer 280 to assist in forming a liquid-tight connection between the valve seal 200 and the valve seat 300, as shown in FIG. 15.

Figure 7:
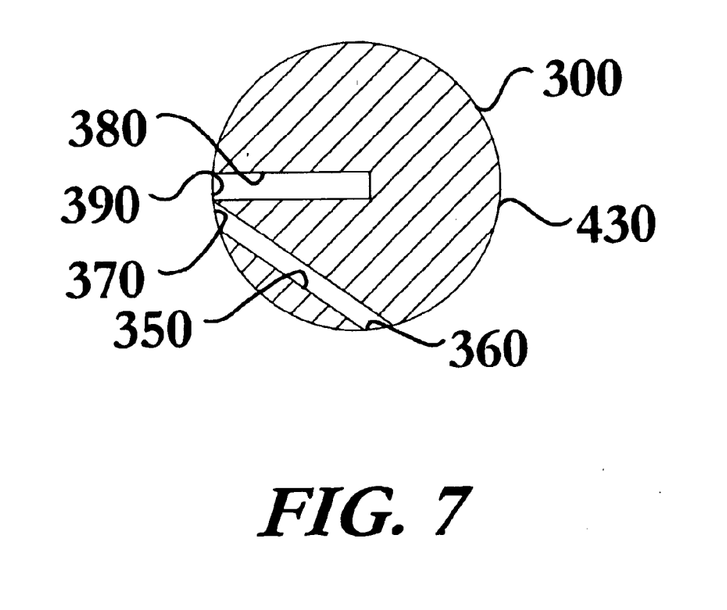
FIG. 7 is a cross section view taken along line 7—7 of FIG. 6.
Figure 16:
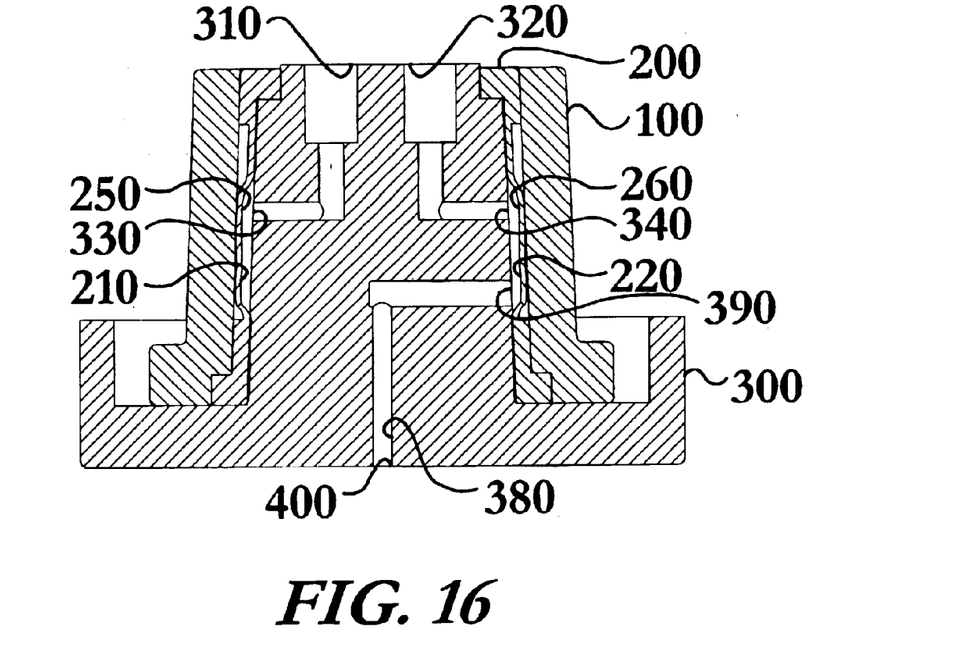
FIG. 16 is a cross section view taken along line 14—14 of FIG. 13 with the valve seal distended.

As first pressurized fluid enters the first inlet channel 310 it is retained at the first exit opening 330 by the first elastomeric portion 250 until the fluid achieves a first predetermined pressure whereby the fluid pressure distends the first elastomeric portion 250 away from the valve seat 300, as shown in FIG. 16, thereby creating a first chamber 210 bounded by the first separator 230, the second separator 240, the distal retainer 270, and the proximal retainer 280, as illustrated in FIG. 8, FIG. 9, and FIG. 10. Similarly, as second pressurized fluid enters the second inlet channel 320 it is retained at the second exit opening 340 by the second elastomeric portion 260 until the fluid achieves a second predetermined pressure whereby the fluid pressure distends the second elastomeric portion 260 away from the valve seat 300, as shown in FIG. 16, thereby creating a second chamber 220 bounded by the first separator 230, the second separator 240, the distal retainer 270, and the proximal retainer 280, as illustrated in FIG. 8, FIG. 9, and FIG. 10. Once the first pressurized fluid has created, and can flow through, the first chamber 210, the first pressurized fluid additionally lifts the first elastomeric portion 250 from the cross chamber channel inlet opening 360 thereby allowing the first pressurized fluid to enter the cross chamber channel 350. Similarly, once the second pressurized fluid has created, and can flow through, the second chamber 220, the second pressurized fluid additionally lifts the second elastomeric portion 260 from the terminal channel inlet opening 390, and from the cross chamber channel exit opening 370, thereby allowing either the first pressurized fluid, the second pressurized fluid, or a combination of both fluids to enter the terminal channel 380 and to ultimately leave the apparatus 50 through the terminal channel exit opening 400, as illustrated in FIG. 7, FIG. 14, and FIG. 16.

The flow of the first and second pressurized fluids may be staged sequentially or may flow simultaneously. With reference again to FIG. 16, applications that require purgeability, either due to the properties of a fluid or to ensure delivery of an entire dosage, may utilize a purge fluid delivered through first inlet channel 310 following the delivery of a primary fluid through the second inlet channel 320. Therefore, the primary fluid may enter the second inlet channel 320 through the second inlet opening 345 whereby it is retained at the second exit opening 340 until achieving the second predetermined pressure required to distend the second elastomeric portion 260 away from the second exit opening 340 and create the second chamber 220. As the second chamber 220 expands to the boundaries due to the inflow of the primary fluid, the second elastomeric portion 260 is lifted from the terminal channel inlet opening 390, and in various embodiments, the cross chamber channel exit opening 370, thereby allowing the primary fluid to enter the terminal channel 380, as well as the cross chamber channel 350, and exit the apparatus 50 through the terminal channel exit opening 400, as illustrated in FIG. 5 through FIG. 16. A unidirectional flow control device may be added in the cross chamber channel 350 to prevent primary fluid from entering the cross chamber channel exit opening 370. Upon a drop in the pressure of the primary fluid below the second predetermined pressure, the second elastomeric portion 260 returns to the non-distended position, forcing any fluid remaining in the second chamber 220 out through the terminal channel 380. A secondary purge fluid may then be introduced into the first inlet channel 310. As previously described, the purge fluid would be retained at the first exit opening 330 until reaching the first predetermined pressure, distending the first elastomeric portion 250 from the valve seat 300 and creating a first chamber 210 by the inflow of the purging fluid. As the first chamber 210 expands to the boundaries, the first elastomeric portion 250 is lifted from the cross chamber channel inlet opening 360 thereby permitting the purging fluid to proceed to the cross chamber channel exit opening 370. The purging fluid may then be retained at the cross chamber channel exit opening 370 if the pressure of the purging fluid is below the second predetermined pressure required to distend the second elastomeric portion 260, or if the pressure is greater than the second predetermined pressure the purging fluid will distend the second elastomeric portion 260 and enter the terminal channel 380 by uncovering the terminal channel inlet opening 390, or the purging fluid may simply pass into the terminal channel as illustrated by the embodiments of FIG. 19 and FIG. 20. The purging fluid will purge the entire terminal channel 380 ensuring that all of the primary fluid has been discharged from the terminal channel 380. One with skill in the art will recognize the sequence of operation when two fluids are mixed in the apparatus 50.

The plurality of chambers, including the first chamber 210 and the second chamber 220 illustrated in FIG. 16, previously described, may include numerous variations resulting in embodiments that may be useful in a wide variety of industries. One such variation includes the plurality of chambers being formed to have substantially equal volumes when exposed to fluids having similar characteristics. Alternatively, the plurality of chambers may be formed to have unequal volumes when exposed to fluids having similar characteristics.

Figure 18:
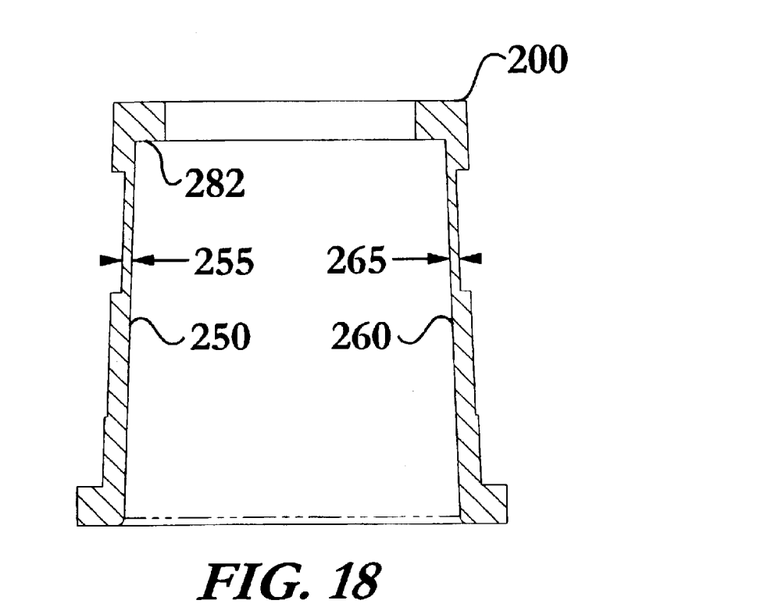
FIG. 18 is a cross section view taken along line 9—9 of FIG. 8 of a variation of the valve seal.

Varying the volumes of the plurality of chambers may be accomplished in a number of ways. Additionally, the methods used in varying the chamber volumes may also be used in varying the various predetermined pressures, or cracking pressures, required to distend the valve seal 200 from the valve seat 300. For example, with reference to FIG. 8, the locations of the first separator 230 and the second separator 240 may be varied so that their locations are not substantially opposite each other. Further, first separator width 235 and the second separator width 245 may be varied to be substantially equal or substantially unequal, thereby changing the characteristics of the first chamber 210 and second chamber 220. Additionally, the properties of the first elastomeric portion 250 and the second elastomeric portion 260 may be varied. For example, the bulk modulus of the valve seal 200 may be varied thereby influencing the volume of the first chamber 210 and second chamber 220 as well as the cracking pressure. In yet another variation, the first elastomeric portion thickness 255 and the second elastomeric portion thickness 265 may be varied to produce desired effects. One example of varying the first elastomeric portion thickness 255 and the second elastomeric portion thickness 265 is illustrated in FIG. 18. Additional variations may include varying the thickness in strategic locations such as in the vicinity of the openings, so as to utilize the first elastomeric portion 250 and second elastomeric portion 260 to create directed channels with the first chamber 210 and the second chamber 220. A further variation may include at least one cross chamber channel incorporated into the valve seal 200. For example, at least one cross chamber channel may be formed in one of the plurality of separators such that the channel is normally closed but would open upon exposure to a predetermined pressure.

Figure 17:
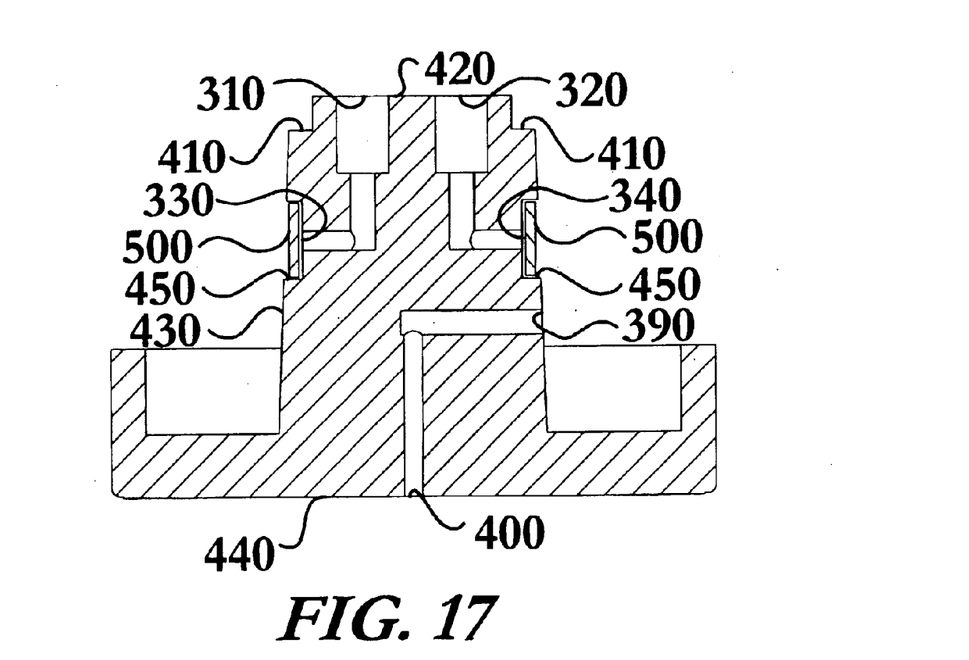
FIG. 17 is cross section view taken along line 14—14 of FIG. 13 of a variation of the valve seat.

Yet a further variation of the apparatus, shown in FIG. 17, includes a secondary elastomeric member 500 adapted to tightly fit in a secondary recess 450 formed in the valve seat 300 and situated to cover the first exit opening 330 and the second exit opening 340. The valve seal 200 may then cover the valve seat 300 and secondary elastomeric member 500 as previously described. The secondary elastomeric member 500 adds an extra measure of protection guarding against backflow into the first inlet channel 310 and the second inlet channel 320. The extra backflow protection is provided by the fact that if pressurized fluid were to enter the terminal channel 380 and create the second chamber 220 by distending the second elastomeric portion 260 and flow through the cross chamber channel 350 to create the first chamber 210, the fluid would not be able to distend the secondary elastomeric member 500 and access the first inlet channel 310 or the second inlet channel 320. In fact, the fluid would act against the seal side of the secondary elastomeric member 500 thereby creating a tighter closure between the secondary elastomeric member 500 and the first exit opening 330 and the second exit opening 340.

Additional variations of the apparatus 50 incorporate valve housing 100 alterations. The valve housing 100 may be formed to act with the valve seat 300 to partially enclose a portion of the valve seal 200, thereby minimizing the area of the valve seal 200 exposed to atmosphere. Alternatively, certain applications warrant the additional backflow protection offered by having the valve housing 100 vented to atmosphere.

In addition to varying the cracking pressure in the vicinity of specific openings, the addition of the secondary elastomeric member 500, and incorporation of a vented valve housing 100, additional backflow prevention may be obtained by varying the actual size of the various inlet and exit openings. For example, a small terminal channel inlet opening 390 would require a tremendous backpressure to achieve the force necessary to distend the second elastomeric portion 260.

Those with skill in the art would recognize the numerous possible variations associated with the assembly with the apparatus 50. For example, the apparatus 50 may be configured such that the various components are releasably connected or permanently connected, and such connections may be made utilizing mechanical connectors or virtually any materials joining technology.

Similarly, one with skill in the art would recognize that the plurality of channels may be formed to facilitate the specific fluid flow parameters of any particular application. For example, the plurality of channels may be extremely smooth and straight for optimum flow and minimum resistance, or they may be formed with harsh angles allowing for ease in manufacture. Additionally, the channels may be formed to take any shape and may be lined to prevent corrosion and reduce resistance. Similarly, the plurality of inlet openings may be adapted to mate with any fluid handling adaptor or fitting.

One skilled in the art will realize that the apparatus 50 and its components may be fabricated from a wide variety of materials, selected to reflect particular characteristic desired for operation with a variety of fluids, including, by way of example and not limitation, metals, plastic, glass, natural and synthetic rubbers, fibers, and composites of various types.

Likewise, while the specific embodiments illustrated in FIG. 1 through FIG. 20 illustrate the plurality of chambers being formed entirely from the valve seal 200, one with skill in the art would recognize alternative chamber forming methods. One such method may include the cooperation of the valve seat 300 and the valve housing 100 to bound the plurality of elastomeric portions thereby creating the plurality of chambers. For instance, in one embodiment the valve seat 300 may be formed with a plurality of recesses in which a matching plurality of cooperating ledges on the housing, interior surface 110 of the valve housing 100 tightly fit, compressing the valve seal 200 therebetween. In this particular example, the cooperating recesses and ledges act to perform the same function as the plurality of separators previously described.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

We claim:

1. A multi-channel valve apparatus, comprising:
   a valve seat having at least one sidewall and being formed to have a plurality of channels including at least one cross chamber channel, each channel having at least one inlet opening and at least one exit opening, wherein the at least one inlet opening of the at least one cross chamber channel is located on the at least one sidewall;
   a valve seal adapted to tightly enclose at least a portion of the valve seat, thereby covering at least the cross chamber channel inlet opening, wherein the valve seal is distensible away from the valve seat when acted upon by a fluid at a predetermined pressure in one of the plurality of channels, thereby creating a plurality of chambers such that all fluid entering the apparatus must pass through at least one of the plurality of chambers prior to leaving the apparatus; and
   a valve housing adapted to releasably secure the valve seal to the valve seat.

2. The apparatus of claim 1, wherein the valve seal is formed to have a plurality of separators each having a separator width, a plurality of elastomeric portions each having an elastomeric portion thickness, and a plurality of retainers.

3. The apparatus of claim 1, wherein the valve seat is formed to have a seal engagement shelf, a top surface, and an exit surface.

4. The apparatus of claim 2, wherein the plurality of channels includes a plurality of inlet channels including at least a first inlet channel, having a first inlet opening and a first exit opening, a second inlet channel, having a second inlet opening and a second exit opening, and wherein the plurality of elastomeric portions includes a first elastomeric portion and a second elastomeric portion, the plurality of separators includes a first separator and a second separator, and the plurality of retainers includes a distal retainer and a proximal retainer.

5. The apparatus of claim 4, wherein the valve seat is formed such that the first inlet opening and the second inlet opening are located on the top surface of the valve seat.

6. The apparatus of claim 4, wherein the first exit opening and the second exit opening terminate on the at least one sidewall.

7. The apparatus of claim 4, wherein the plurality of channels includes at least one terminal channel having at least one terminal channel inlet opening and at least one terminal channel exit opening.

8. The apparatus of claim 7, wherein the first elastomeric portion releasably covers the first inlet channel exit opening and one of the at least one cross chamber channel inlet openings, and is adapted to form a first chamber bounded by the first separator, the second separator, the distal retainer, and the proximal retainer, and the second elastomeric portion releasably covers the second inlet channel exit opening, and one of the at least one terminal channel inlet openings, and is adapted to form a second chamber bounded by the first separator, the second separator, the distal retainer, and the proximal retainer.

9. The apparatus of claim 8, wherein the second elastomeric portion additionally releasably covers one of the at least one cross chamber channel exit openings.

10. The apparatus of claim 1, wherein the plurality of chambers are formed to hold substantially unequal volumes of fluid.

11. The apparatus of claim 2, wherein the plurality of separator widths are substantially unequal.

12. The apparatus of claim 1, wherein the valve housing is formed to have an interior surface, an exterior surface, and a seal engagement ledge.

13. The apparatus of claim 8, wherein the distal retainer is formed to include a retainer engagement shelf and the proximal retainer is formed to include a seat engagement ledge.

14. The apparatus of claim 4, further including a secondary elastomeric member adapted to tightly fit in a secondary recess formed in the valve seat and situated to cover the first exit opening and the second exit opening.

15. The apparatus of claim 1, wherein the valve housing is vented to the atmosphere.

16. The apparatus of claim 2, wherein the elastomeric portion thickness of the at least one elastomeric portion is variable.

17. A multi-channel valve apparatus, comprising:
a valve seat having at least one sidewall, a top surface, and an exit surface, and being formed to have a plurality of channels including at least one cross chamber channel, each channel having at least one inlet opening and at least one exit opening, wherein the at least one inlet opening of the at least one cross chamber channel is located on the at least one sidewall;
a valve seal adapted to tightly enclose at least a portion of the valve seat wherein the valve seal is distensible away from the valve seat when acted upon by a fluid at a predetermined pressure in one of the plurality of channels, thereby creating a plurality of chambers, the valve seal being formed to have a plurality of separators each having a separator width, a plurality of elastomeric portions each having an elastomeric portion thickness, and a plurality of retainers; and
a valve housing adapted to releasably secure the valve seal to the valve seat.

18. The apparatus of claim 17, wherein the valve seat is formed to have a seal engagement shelf.

19. The apparatus of claim 17, wherein the plurality of channels includes a plurality of inlet channels including at least a first inlet channel, having a first inlet opening and a first exit opening, a second inlet channel, having a second inlet opening and a second exit opening, and wherein the plurality of elastomeric portions includes a first elastomeric portion and a second elastomeric portion, the plurality of separators includes a first separator and a second separator, and the plurality of retainers includes a distal retainer and a proximal retainer.

20. The apparatus of claim 19, wherein the valve seat is formed such that the first inlet opening and the second inlet opening are located on the top surface of the valve seat.

21. The apparatus of claim 19, wherein the first exit opening and the second exit opening terminate on the at least one sidewall.

22. The apparatus of claim 19, wherein the plurality of channels includes at least one terminal channel having at least one terminal channel inlet opening and at least one terminal channel exit opening.

23. The apparatus of claim 19, wherein the first elastomeric portion releasably covers the first inlet channel exit opening and one of the at least one cross chamber channel inlet openings, and is adapted to form a first chamber bounded by the first separator, the second separator, the distal retainer, and the proximal retainer, and the second elastomeric portion releasably covers the second inlet channel exit opening, and one of the at least one terminal channel inlet openings, and is adapted to form a second chamber bounded by the first separator, the second separator, the distal retainer, and the proximal retainer.

24. The apparatus of claim 23, wherein the second elastomeric portion additionally releasably covers one of the at least one cross chamber channel exit openings.

25. The apparatus of claim 17, wherein the plurality of separator widths are substantially unequal.

26. The apparatus of claim 17, wherein the valve housing is formed to have an interior surface, an exterior surface, and a seal engagement ledge.

27. The apparatus of claim 19, wherein the distal retainer is formed to include a retainer engagement shelf and the proximal retainer is formed to include a seat engagement ledge.

28. The apparatus of claim 19, further including a secondary elastomeric member adapted to tightly fit in a secondary recess formed in the valve seat and situated to cover the first exit opening and the second exit opening.

29. The apparatus of claim 17, wherein the valve housing is vented to the atmosphere.

30. The apparatus of claim 17, wherein the elastomeric portion thickness of the at least one elastomeric portion is variable.

31. A multi-channel valve apparatus, comprising:
a valve seat having at least one sidewall, a top surface, and an exit surface, and being formed to have a cross chamber channel, having cross chamber channel inlet opening and a cross chamber channel exit opening wherein the cross chamber channel inlet opening is located on the at least one sidewall, a first inlet channel, having a first inlet opening and a first exit opening located on the at least one sidewall, a second inlet channel, having a second inlet opening and a second exit opening located on the at least one sidewall, and terminal channel having a terminal channel inlet opening and a terminal channel exit opening;
a valve seal adapted to tightly enclose at least a portion of the valve seat wherein the valve seal is distensible away from the valve seat when acted upon by a fluid at a predetermined pressure in one of the plurality of channels, thereby creating a plurality of chambers, the valve seal being formed to have a first separator having a first separator width and a second separator having a second separator width, a first elastomeric portion releasably covering (a) the first inlet channel exit opening and (b) the cross chamber channel inlet opening, and a second elastomeric portion releasably covering (c) the second inlet channel exit opening, and (d) the terminal channel inlet opening, a distal retainer, and a proximal retainer;
a first chamber formed by the first elastomeric portion and bounded by the first separator, the second separator, the distal retainer, and the proximal retainer;
a second chamber formed by the second elastomeric portion and bounded by the first separator, the second separator, the distal retainer, and the proximal retainer; and
a valve housing adapted to releasably secure the valve seal to the valve seat.

32. The apparatus of claim 31, wherein the cross chamber channel exit opening is located on the at least one sidewall and is releasably covered by the second elastomeric portion.

33. The apparatus of claim 31, wherein the valve housing us formed to have an interior surface; an exterior surface, and a seal engagement ledge.

34. The apparatus of claim 31, wherein the distal retainer is formed to include a retainer engagement shelf and the proximal retainer is formed to include a seat engagement ledge.

35. The apparatus of claim 31, further including a secondary elastomeric member adapted to tightly fit in a secondary recess formed in the valve seat and situated to cover the first exit opening and the second exit opening.

36. The apparatus of claim 31, wherein the elastomeric portion thickness of the at least one elastomeric portion is variable.

37. A means for fluid control, comprising:

a means for channeling a plurality of fluids including a plurality of means for directing the plurality of fluids, each directing means having at least one means for admitting the plurality of fluids to the directing means and at least one means for discharging the plurality of fluids from the directing means;

a means fur containing the plurality of fluids including a plurality of means for creating an elastic region when acted upon by a fluid at a predetermined pressure in one of the plurality of directing means;

a means for establishing fluid communication between at least two of the plurality of the elastic region creation means, the fluid communication establishing means having an entry and an exit, wherein the containing means coven the fluid communication establishing means entry when not acted upon by a fluid at a predetermined pressure in one of the plurality of directing means; and a means for enclosing the channeling means and the containing means.

* * * * *